United States Patent [19]

Weyand et al.

[11] Patent Number: 4,500,406

[45] Date of Patent: Feb. 19, 1985

[54] INERT ELECTRODE CONNECTION

[75] Inventors: John D. Weyand, Greensburg; Robert W. Woods, New Kensington; David H. DeYoung; Siba P. Ray, both of Plum Boro, all of Pa.

[73] Assignee: Aluminum Company of America, Pittsburgh, Pa.

[21] Appl. No.: 560,602

[22] Filed: Dec. 12, 1983

[51] Int. Cl.³ ............................................. C25B 11/04
[52] U.S. Cl. .................................. 204/293; 204/292; 419/6; 419/48; 419/57
[58] Field of Search ............... 204/279, 280, 292, 293; 419/6, 48, 57; 428/548, 551, 565

[56] References Cited

U.S. PATENT DOCUMENTS

| | | | |
|---|---|---|---|
| 2,175,899 | 10/1939 | Kelly | 419/6 |
| 2,362,353 | 11/1944 | Cate | 419/6 |
| 3,123,471 | 3/1964 | Marshall | 419/6 |
| 3,148,981 | 9/1964 | Rushkewitch | 419/6 |

Primary Examiner—John F. Niebling
Attorney, Agent, or Firm—Andrew Alexander; John P. Taylor

[57] ABSTRACT

An inert electrode connection is disclosed wherein a layer of inert electrode material is bonded to a layer of conductive material by providing at least one intermediate layer of material therebetween comprising a predetermined ratio of inert material to conductive material. In a preferred embodiment, the connection is formed by placing in a die a layer of powdered inert material, at least one layer of a mixture of powdered inert material and conductive material, and a layer of powdered conductive material. The connection is then formed by pressing the material at 15,000–20,000 psi to form a powder compact and then densifying the powder compact in an inert or reducing atmosphere at a temperature of 1200°–1500° C.

17 Claims, 5 Drawing Figures

Note: No laminations formed at the three interfaces.

Ni Metal to Inert Anode Material Graded Connection

INERT ELECTRODE CONNECTION

BACKGROUND OF THE INVENTION

1. Origin of Invention

This invention disclosure described herein was made in the course of, or under, Department of Energy Contract No. DE-FC07-80C540158.

2. Technical Field of the Invention

This invention relates to an inert-type electrode composition useful in the electrolytic production of metals, such as aluminum, lead, magnesium, zinc, zirconium, titanium, silicon, and the like, by the electrolytic reduction of oxides or salts of respective metals. More particularly, the invention relates to a connection made between an inert electrode composition and a conductive material.

3. Background Art

Conventionally, metals, such as aluminum, for example, are produced by electrolysis of alumina dissolved in molten salts using carbon electrodes. However, the oxygen released by the reduction of alumina reacts with the carbon electrodes to form carbon dioxide resulting in a decomposition and consumption of the carbon electrodes. As a result, about 0.33 pounds of carbon must be used for every pound of aluminum produced. Carbon, such as that obtained from petroleum coke, is normally used for such electrodes. However, because of the increasing costs of such cokes, it has become economically attractive to find a new material for the electrodes. A desirable material would be one which would not be consumed, i.e. resistant to oxidation, and which would not be attacked by the molten salt bath. In addition, the new material should be capable of providing a high energy efficiency, i.e. have a high conductivity, should not affect the purity of metal, should have good mechanical properties, and should be economically acceptable with respect to the cost of raw material and with respect to fabrication.

Numerous efforts have been made to provide an inert electrode having the above characteristics but apparently without the required degree of success to make it economically feasible. In many instances, this is because the inert electrodes in the art appear to be reactive to an extent which results in contamination of the metal being produced as well as consumption of the electrode.

While it is important that the inert electrode composition be nonreactive from the standpoint of contamination of the metal being produced, it is equally important that the inert electrode composition have suitable conductivity. Such an inert electrode composition is described and claimed in Ray et al U.S. Pat. No. 4,454,015, and assigned to the assignee of the present invention, cross reference to which is hereby made.

It is also important the inert electrode composition be bondable to a conductive material, such as a metal rod or the like, which will provide both the desired electrical connection to the electrode material as well as provide support and required strength for maintaining an inert electrode made from such a composition in an electolytic cell.

SUMMARY OF THE INVENTION

It is, therefore, an object of the present invention to provide an inert electrode connection.

It is another object of the present invention to provide an inert electrode connection between an inert electrode composition and conductive material.

It is yet another object of the invention to provide an inert electrode connection whereby one or more layers of material comprising a blend of the inert electrode material and the conductive material are interspersed between the electrode material and the conductive material.

It is a further object of the invention to provide an inert electrode connection wherein particulate inert electrode material is placed in a first layer and particulate conductive material is placed in another layer and at least one layer of a mixture of particulate inert electrode material and inert conductive material is placed therebetween.

It is a still further object of the invention to provide an inert electrode connection whereby particulate layers respectively of inert electrode material, conductive material and at least one layer of a mixture thereof interspersed therebetween are subjected to pressure and subsequently sintered at an elevated temperature to provide the desired connection.

In accordance with the invention, an inert electrode composition is provided comprising a first layer of an inert electrode composition, a second layer of a conductive material, and at least one layer therebetween comprising a mixture of inert electrode material and conductive material.

In a preferred embodiment, a plurality of intermediate layers, each comprising a predetermined ratio of inert electrode material and conductive material, are provided between the inert electrode layer and the conductive material layer, and the particulate mixture is formed into a connection by forming a powder compact under pressure and then sintering the compact at an elevated temperature in an inert atmosphere.

DESCRIPTION OF THE INVENTION

Figure 1:
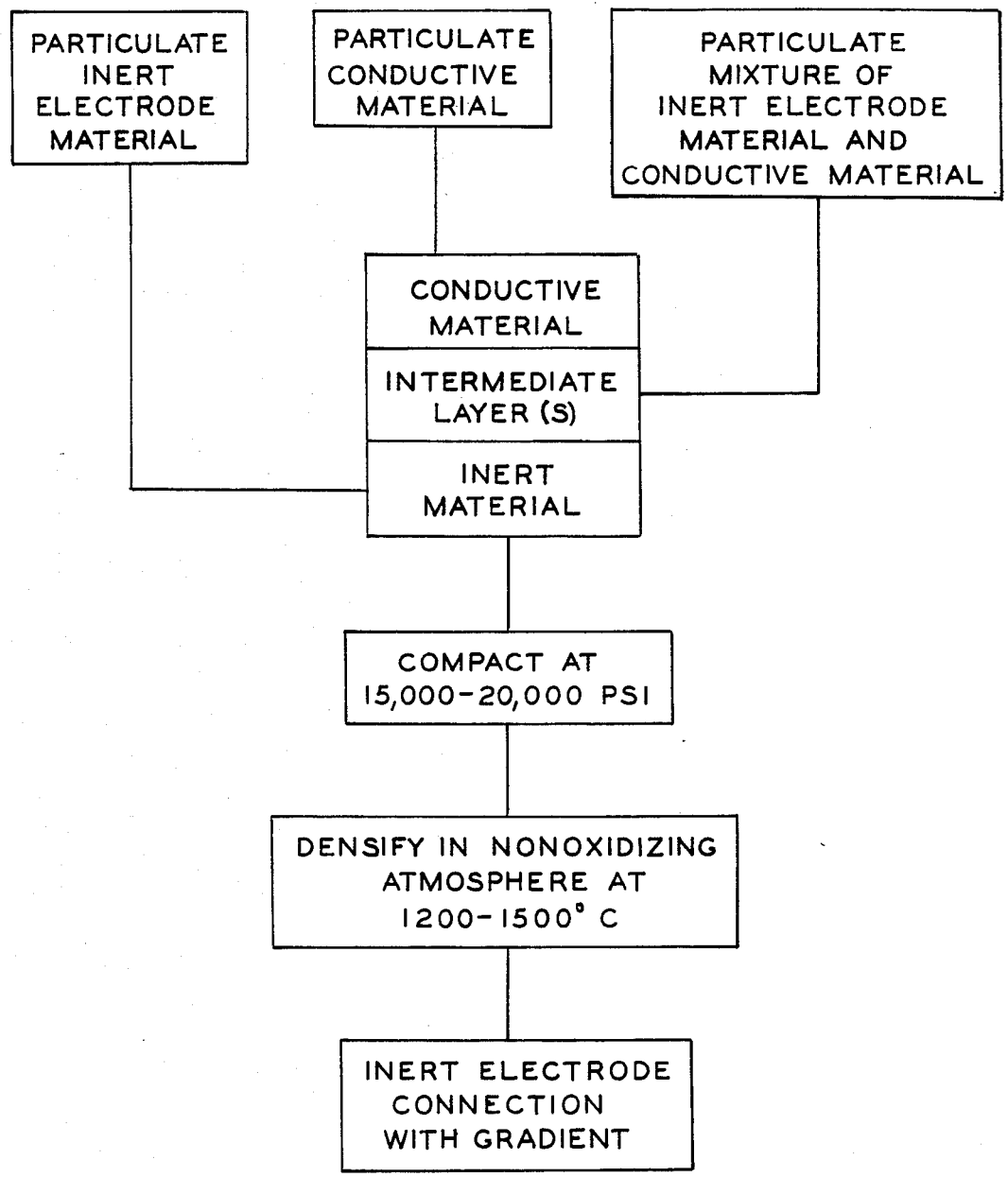
FIG. 1 is a flow sheet illustrating the invention.

The inert electrode connection of the invention is made by placing one or more layers of an intermediate material containing a predetermined ratio (or ratios) of the inert electrode material and the conductive material between a layer of inert electrode material and a layer of conductive material. In the preferred embodiment, each of the layers initially comprise particulate material which is placed in a die to compact and densify the powder. The powdered compact is subsequently densified under an inert or reducing atmosphere at an elevated temperature. The particle size of the materials in the layers may vary from 60 to 400 mesh (Tyler Series) but preferably is from 100 to 200 mesh. In accordance with one embodiment of the invention, a layer of particulate inert electrode material is placed in a die. A particulate layer of an intermediate powder mixture is then placed over the inert electrode material to a thickness of at least 0.2 inch. In its simplest form, the invention comprises the use of one intermediate layer containing approximately 20-80 vol.% inert electrode material and the remainder conductive material. A layer of particulate conductive material is then added to the mold. The powder filled mold is then pressed at 15,000-20,000 psi to consolidate the powder. The powder compact is then removed from the die and densified under an inert or reducing atmosphere using, for example, argon or nitrogen as an inert atmosphere at a temperature of about 1200°-1500° C. depending upon the melting point of the material used. In a particularly preferred embodiment, the inert electrode material comprises an iron-iron oxide-nickel oxide mixture such as described in the aforementioned Ray et al. U.S. Pat. No. 4,454,015, and the conductive material comprises nickel powder. When such materials are used, the temperature of the furnace should be about 1300°-1400° C. Examples of other types of inert electrode materials useful in the invention are disclosed in Ray U.S. Pat. No. 4,374,050, incorporated herein by reference.

It is within the contemplation of this invention that more than one graded layer may be used to facilitate the production of the inert electrode connection. For example, two intermediate layers could be used wherein the first layer which is placed over the inert electrode material comprises 67 wt.% inert electrode material and 33 wt.% conductive material. A second intermediate layer comprising 33 wt.% inert electrode material and 67 wt.% of conductive material is then placed over the first intermediate layer. Each intermediate layer should then have a minimum thickness of about 0.1 inch and preferably at least 0.20 inch. It should be noted in this regard that there is no particular dimensional requirements for the layer of inert electrode material or the layer of conductive material since it is only the gradient to be established therebetween which requires a minimum amount of intermediate material to provide the desired gradient.

A further example of intermediate layers would comprise a first intermediate layer of 80 wt.% inert electrode and 20 wt.% conductive material, a second intermediate layer of 60 wt.% inert electrode to 40 wt.% conductive material, a third intermediate layer of 40 wt.% inert electrode to 60 wt%. conductive material, and a fourth intermediate layer of 20 wt.% inert electrode material and 80 wt.% conductive material.

In the preferred embodiment, the conductive layer comprises nickel or alloys thereof. Other metals which may be used for the conductive layers include, for example, nickel iron alloys having 40 to 70 wt.% nickel and the remainder iron. It will be understood that the preferred metal has a coefficient of thermal extrusion compatible with the electrode material to prevent fractures which result in poor contact between these materials. For example, other metals or alloys thereof useful in this application include Cu, Pt, Rh, Co and Cr. It will be understood that the choice of metal will depend to some extent on the inert electrode material used.

Figure 2:
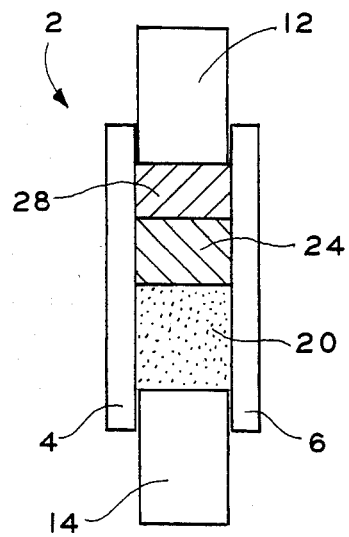
FIG. 2 is a cross-sectional view of the connection being formed in a uniaxial pressing die.

Referring now to FIG. 2, a uniaxial pressing die is shown at 2 comprising walls 6 and 8 and having an upper punch 12 and a lower punch 14. With upper punch 12 removed, a layer of inert electrode powder 20 is placed in the die followed by a layer which, in the illustrated embodiment, comprises 50 wt.% inert electrode power and 50 wt.% of the conductive material as a layer 24. Finally, a layer of conductive material 28 is placed in the die, and upper punch 12 is inserted. A die is then inserted into a press and pressed at 15,000-20,000 psi. The powder compact is then densified at a temperature of 1200°-1500° C. in a non-oxidizing atmosphere. The use of this type of die is preferred in making connections between inert electrode rods and their supporting connections used for both electrical and mechanical purposes.

Figure 3:
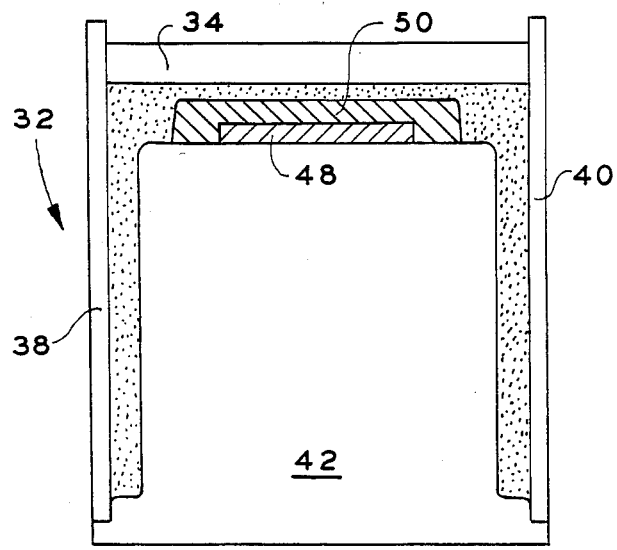
FIG. 3 is a cross-sectional view of the inert electrode connection being formed in an isostatic pressing die.

Turning to FIG. 3, an isostatic pressing die is shown at 32 comprising an upper wall 34 and side walls 38 and 40. A steel mandrel 42 forms the bottom portion of the die 32. The conductive metal member is first centrally placed on mandrel 42 and forms a layer 48 of the conductive metal material. Around this is placed a layer 50 which, in the illustrated embodiment, comprises a 50-50 wt.% mixture of the conductive metal and the inert electrode material. The inert electrode powder is then poured over layer 50 and around the sides of the mandrel to form a hollow electrode 54 which encases the layer 50 and the conductive material layer 48. Following pressing, the connection is then densified in the same manner as the design shown in FIG. 2.

In either instance, it should be noted that the layer of conductive material in the finished connection may then be used as a base for further attachment of a stub of a conductive metal electrode which would in turn be connected to the main bus of the electrolytic cell. For example, a nickel stub could be diffusion or inertial welded to a powder metallurgy sintered nickel part of the graded metal connection when nickel comprises the conductive metal portion of the connection.

It should be further noted that while the use of powdered materials is preferred for all the layers, one or more layers could be replaced by a solid material in some instances. For example, in the embodiment shown in FIG. 3, the conductive metal layer 48 could be a slug of metal, i.e. nickel metal. Furthermore, particularly if multiple layers of intermediate material are used, they may comprise thin slugs or washers which would then melt sufficiently upon firing to form the desired gradient connection between the conductive metal portion and the inert electrode portion. However, it should be kept in mind that the purpose or use of the inert material/conductive material layers is to provide a gradient where the particular conductive metal and the inert material have different temperature characteristics which prevent or inhibit the forming of a satisfactory electrical and mechanical connection directly. Therefore, the use of powdered layers is preferred to provide the necessary thickness of the gradient and at the same time to permit homogeneous bonding at the interfaces between the layers to form a continuous gradient rather than a series of intermediate but defined interfaces between layers.

Figure 4:
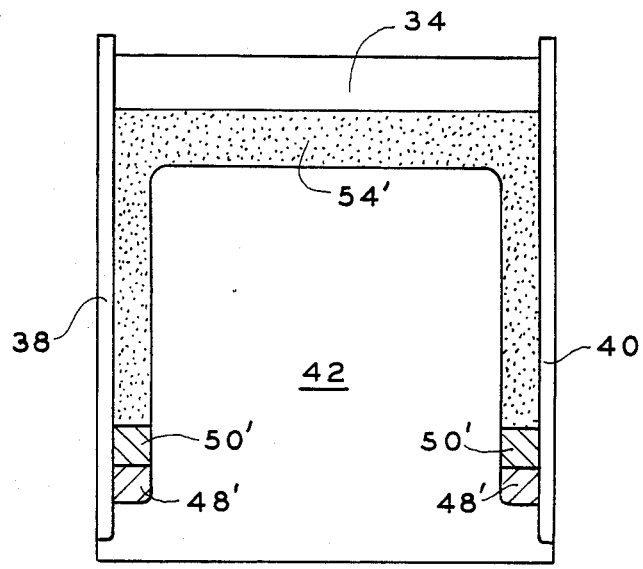
FIG. 4 is a cross-sectional view of another design of the inert electrode connection being formed in an isostatic pressing die.

Referring now to FIG. 4, another design of a connection is shown using an isostatic pressing mold. In this design, the conductive metal layer 48' is placed at the bottom of the defined space between the steel mandrel 42 and sidewalls 38 and 40. The layer of intermediate material 50' is then placed directly above layer 48' and the remainder of the mold is filled with inert material to form a hollow electrode layer 54'.

Figure 5:
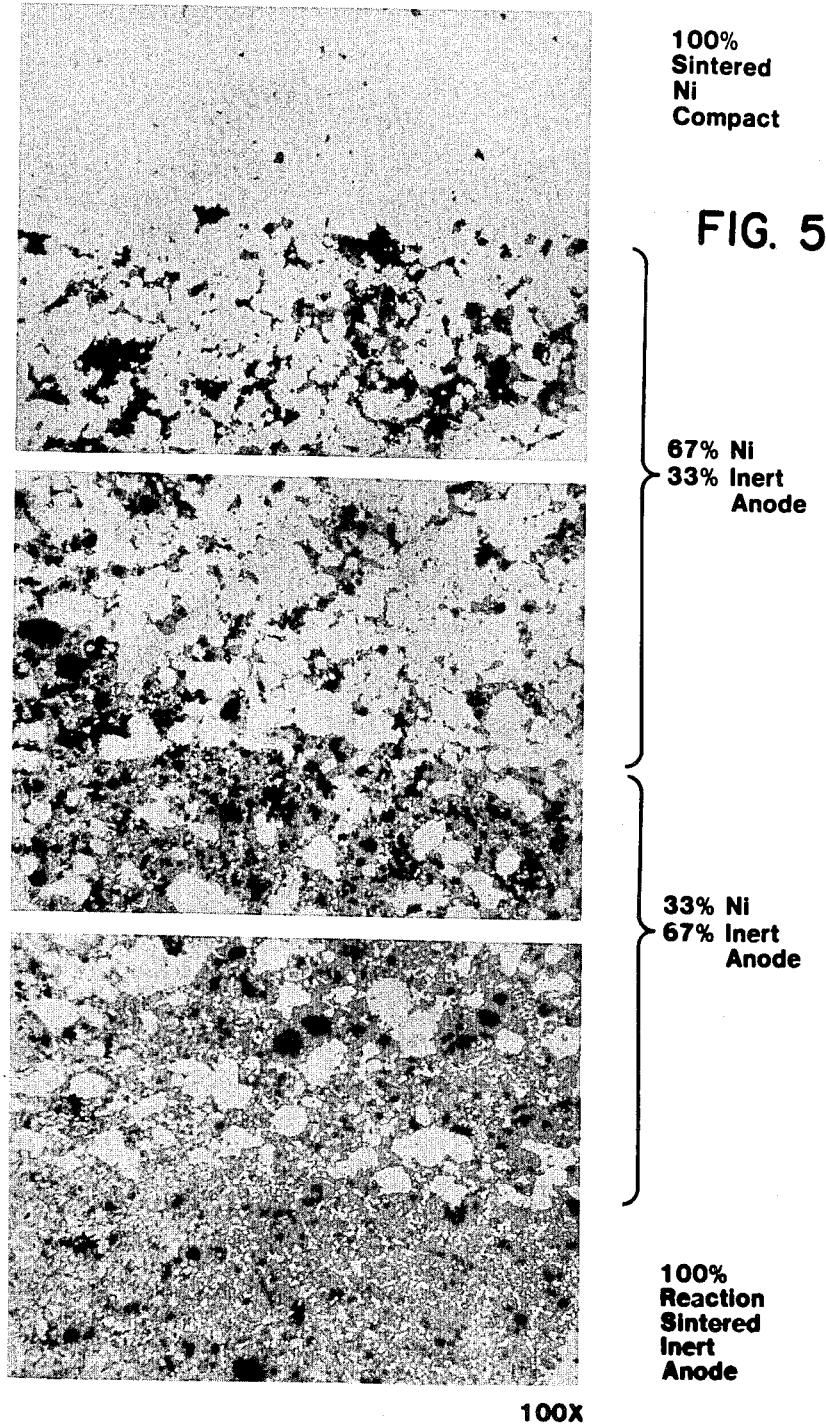
FIG. 5 is a photomicrograph at 100× magnification of an inert electrode connection made in accordance with the invention.

To further illustrate the invention, a layer of reaction sintered inert anode comprising an iron-iron oxide-nickel oxide material having a particle size range of 0.5 to 50 μm and made in accordance with the aforementioned Ray et al. U.S. Pat. No. 4,454,105 was placed in an uniaxial pressing die having a diameter of about 1.0 inch. A 0.4 inch thick layer comprising 33 wt.% nickel having a particle size range of 10 to 110 μm and 67 wt.% of the above inert electrode material was then placed in the die followed by a second intermediate layer of 0.3 inch thickness and comprising 67 wt.% of the nickel powder and 33 wt.% of the inert electrode powder. Finally, a 0.4 inch thick layer of 100% of the nickel powder was placed in the die. The mixture was pressed at 20,000 psi. The powder compact was then removed from the die and densified in an inert atmospheric furnace using argon gas at 1350° C. for 4 hours. The resulting connection was removed from the furnace and sectioned to examine the interfaces. FIG. 5 represents a photomicrograph at 100× magnification showing the graded connection made between the nickel metal and the inert electrode. It will be noted that no laminations were formed at the three interfaces indicating a substantially homogeneous gradation between the nickel and the inert electrode material. The tensile strength of the sample was measured and found to be 6300 psi.

Thus, the invention provides a satisfactory connection between a conductive material, such as a metal chosen for its electrical conductivity and mechanical strength, and an inert electrode material which is chosen to provide an electrically conductive electrode which is relatively inert to the electrolytic reaction being carried out and which will not be consumed by the gases being given off during the electrolytic reduction action.

Having thus described the invention, what is claimed is:

1. An inert electrode suitable for use in an electrolytic reduction cell for the production of aluminum characterized by good electrical conductivity and substantial inertness to the electrolyte in the molten salt bath comprising an interwoven network of a nickel-iron alloy and at least one nickel-iron oxide and having an electrical-mechanical connection thereto capable of carrying electrical current between said electrode and a source of current; said electrical-mechanical connection comprising a first portion consisting essentially of said inert electrode material, a second portion comprising a conductive metal material selected from the class consisting of nickel and nickel-iron alloys, and at least one region therebetween comprising an electrically conductive gradient of said inert electrode material and said conductive metal material whereby a continuous conductive path of nickel/nickel-iron material will extend from said conductive metal into said molten salt bath while said oxides dispersed throughout the inert electrode will provide sufficient inertness to protect the conductive portions.

2. The inert electrode of claim 1 wherein said gradient, consisting of one or more layers containing a mixture of said interwoven network of nickel-iron alloy and one or more nickel-iron oxides and said conductive metal in various ratios, is formed by bonding the layers together using pressure and heat.

3. The connection of claim 1 wherein said gradient is characterized by the substantial absence of laminations between the layers.

4. The connection of claim 3 wherein said layers initially comprise particulate material to aid in the formation of said gradient.

5. The connection of claim 4 wherein said gradient is formed by pressing said particulate layers together and densifying the resulting compact at an elevated temperature.

6. The connection of claim 5 wherein said compact is formed by pressing together said layers at a pressure of from 15,000 to 20,000 psi.

7. The connection of claim 5 wherein said compact is densified at a temperature of from 1200° to 1500° C.

8. The connection of claim 7 wherein said compact is densified in a non-oxidizing atmosphere.

9. The connection of claim 8 wherein said non-oxidizing atmosphere comprises an inert atmosphere.

10. A method of making an inert electrode conductive connection between a conductive member and an inert electrode suitable for use in an electrolytic reduction cell containing a molten salt bath for the production of aluminum, said method comprising:
    (a) forming a powder compact under pressure containing the following layers:
    (1) a first inert electrode layer consisting of particles containing an interwoven matrix of a nickel-iron alloy and one or more nickel-iron oxides characterized by good electrical conductivity and substantial inertness to the electrolyte in the molten salt bath;
    (2) a conductive metal layer consisting of particles of a metal selected from the class consisting of nickel and nickel-iron alloys; and
    (3) at least one conductive layer of a mixture of particles of said inert electrode material and said conductive metal; and
    (b) heating the layers to from a gradient between said inert electrode layer and said conductive metal layer.

11. The method of claim 10 wherein said powder compact is pressed at a pressure of from 15,000 to 20,000 psi.

12. The method of claim 11 wherein said powder compact is heated to a temperature of from 1200° to 1500° C. to densify said compact.

13. The method of claim 12 wherein said powder compact is densified in a non-oxidizing atmosphere.

14. The method of claim 13 wherein said non-oxidizing atmosphere comprises an inert atmosphere.

15. The method of claim 14 wherein said conductive layer comprises nickel powder having a particle size range of 10 to 100 μm and said inert electrode layer comprises a mixture containing powdered oxides of nickel and iron, said mixture having a particle size range of ½ to 50 μm.

16. The method of claim 15 wherein an intermediate layer having a ratio of 50 wt.% particulate nickel powder and 50 wt.% particulate inert electrode material comprising oxides of iron and nickel is placed between said nickel powder layer and said inert electrode layer.

17. The method of claim 16 wherein a plurality of intermediate layers are placed between said nickel layer and said inert electrode layer, and the ratios of the mixtures in said intermediate layers are varied to assist in forming the gradient between the nickel layer and the inert electrode layer.

* * * * *